US012798286B2

(12) United States Patent
Kim et al.

(10) Patent No.: US 12,798,286 B2
(45) Date of Patent: Nov. 17, 2026

(54) WHEEL AND VEHICLE INCLUDING THE SAME

(71) Applicants: HYUNDAI MOTOR COMPANY, Seoul (KR); KIA CORPORATION, Seoul (KR); HANDS CORPORATION Ltd., Incheon (KR)

(72) Inventors: Ju Ho Kim, Suwon-si (KR); Eun Sik Kim, Gwangmyeong-si (KR); Byoung Ok Park, Incheon (KR); In Bum Hwang, Incheon (KR)

(73) Assignees: HYUNDAI MOTOR COMPANY, Seoul (KR); KIA CORPORATION, Seoul (KR); HANDS CORPORATION LTD., Incheon (KR)

( * ) Notice: Subject to any disclaimer, the term of this patent is extended or adjusted under 35 U.S.C. 154(b) by 146 days.

(21) Appl. No.: 18/910,761

(22) Filed: Oct. 9, 2024

(65) Prior Publication Data

US 2025/0303785 A1 Oct. 2, 2025

(30) Foreign Application Priority Data

Mar. 27, 2024 (KR) ........................ 10-2024-0041709

(51) Int. Cl.
*B60B 7/00* (2006.01)
*B60B 7/04* (2006.01)

(52) U.S. Cl.
CPC ............ *B60B 7/002* (2013.01); *B60B 7/0086* (2013.01); *B60B 7/04* (2013.01); *B60B 2900/1216* (2013.01); *B60B 2900/513* (2013.01)

(58) Field of Classification Search
CPC ....... B60B 7/002; B60B 7/008; B60B 7/0086; B60B 7/04; B60B 19/10; B60B 2900/513; B60B 2900/1216
See application file for complete search history.

(56) References Cited

U.S. PATENT DOCUMENTS 6,517,168 B1 * 2/2003 Van Houten .............. B60B 7/04 301/37.42
8,801,107 B2 * 8/2014 Schmid ...................... B60B 7/04 301/6.3

(Continued)

FOREIGN PATENT DOCUMENTS

CN 109050157 A * 12/2018 ............. B60B 19/10
CN 119427996 A * 2/2025 ............... B60B 7/04

(Continued)

OTHER PUBLICATIONS

Machine translation of CN 109050157 A obtained on Apr. 30, 2026.*

(Continued)

*Primary Examiner* — Adam D Rogers
(74) *Attorney, Agent, or Firm* — Morgan, Lewis & Bockius LLP

(57) ABSTRACT

A wheel for a vehicle includes a wheel disk including a hub to be coupled to an axle, a plurality of spokes extending radially from the hub, and a wheel rim formed on an outside of the spokes, an opening and closing module provided between the spokes and coupled to the wheel disk, an opening and closing member controlling opening and closing of the opening formed in the opening and closing module, and a driving unit engaged to and driving the opening and closing member.

20 Claims, 12 Drawing Sheets

(56) References Cited

U.S. PATENT DOCUMENTS

| | | | | |
|---|---|---|---|---|
| 8,857,921 | B2 * | 10/2014 | Schmid | B60B 7/00 301/6.3 |
| 9,469,155 | B2 * | 10/2016 | Platto | B60B 7/00 |
| 10,513,144 | B2 * | 12/2019 | Heck | B60B 7/0086 |
| 10,882,353 | B2 * | 1/2021 | Fauser | B60B 7/04 |
| 11,007,816 | B2 * | 5/2021 | Groth | B60B 7/066 |
| 11,865,864 | B2 * | 1/2024 | Riech | B60B 7/0086 |
| 2025/0074108 | A1 * | 3/2025 | Wilford-Hunt | B60B 7/20 |
| 2025/0229571 | A1 * | 7/2025 | Harmon | B60B 7/008 |
| 2025/0236134 | A1 * | 7/2025 | Kim | B60B 19/10 |

FOREIGN PATENT DOCUMENTS

| | | | | | |
|---|---|---|---|---|---|
| DE | 102019109601 | A1 | * | 10/2019 | B60B 7/002 |
| DE | 102021004888 | A1 | * | 11/2021 | B60B 3/007 |
| DE | 102022203796 | A1 | * | 10/2023 | B60B 7/04 |
| DE | 102024003134 | A1 | * | 6/2025 | F16D 65/847 |
| EP | 0145487 | A2 | * | 6/1985 | B60B 7/00 |
| EP | 3153328 | A1 | * | 4/2017 | B60B 7/065 |
| FR | 3057805 | A1 | * | 4/2018 | B60B 7/0086 |
| FR | 3057806 | A1 | * | 4/2018 | B60B 7/04 |
| FR | 3057807 | A1 | * | 4/2018 | B60B 7/0086 |
| FR | 3139502 | A1 | * | 3/2024 | B60B 7/0086 |
| KR | 10-2022-0016559 | A | | 2/2022 | |
| KR | 20250040192 | A | * | 3/2025 | H02K 11/042 |
| WO | WO-2012022401 | A1 | * | 2/2012 | B60B 7/0073 |
| WO | WO-2019166715 | A1 | * | 9/2019 | B60B 7/04 |

OTHER PUBLICATIONS

Machine translation of FR 3057805 A1 obtained on Apr. 30, 2026.*
Machine translation of FR 3057807 A1 obtained on Apr. 30, 2026.*
Machine translation of FR 3057806 A1 obtained on Apr. 30, 2026.*
Machine translation of WO 2019/166715 A1 obtained on Apr. 30, 2026.*
Machine translation of WO 2012/022401 A1 obtained on Apr. 30, 2026.*

* cited by examiner

WHEEL AND VEHICLE INCLUDING THE SAME

CROSS-REFERENCE TO RELATED APPLICATION(S)

The present application claims priority to Korean Patent Application No. 10-2024-0041709 filed on Mar. 27, 2024, the entire contents of which is incorporated herein for all purposes by this reference.

BACKGROUND OF THE PRESENT DISCLOSURE

Field of the Present Disclosure

The present disclosure relates to a vehicle wheel and a vehicle including the same.

Description of Related Art

Generally, the wheels of a vehicle are provided to be connected to an axle, and tires in contact with the ground are provided on the wheels. Wheels are important in terms of design, but they also have a major impact on a vehicle's aerodynamic performance and disc brake performance.

Meanwhile, to improve the fuel efficiency of vehicles, it is very important to reduce air resistance acting on vehicles traveling at high speeds. It is known that the top/bottom shape of vehicles contributes about 65% of air resistance, wheels/tires contribute about 25%, and cooling resistance contributes about 10%.

Many global vehicle manufacturers have been conducting research on the tops and bottoms of vehicles for decades, and various air resistance improvement technologies have been developed and applied to actual mass production. However, air resistance improvement technology for wheels/tires that rotate at relatively high speeds has only recently been developed in full scale.

A wheel includes a wheel rim and a wheel disk, and as openings between spokes of the wheel disk are blocked (as an opening ratio is lower), the air resistance tends to be improved. However, if the aperture ratio is too low, air does not pass therethrough properly, making it difficult to sufficiently cool heat generated by the brake disc. Therefore, in actuality, the aperture ratio cannot be lowered unconditionally to improve aerodynamics.

To improve this, technology which may satisfy both braking and aerodynamic performance by applying a device capable of actively opening or closing the opening between spokes has recently been derived.

However, the related art device for opening or closing the opening between spokes is insufficient in terms of structure and efficiency, and furthermore, it may be difficult to install a driving device inside a wheel rotating at high speeds and it may be difficult to stably supply power to the driving device.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a structure of an opening and closing device configured for efficiently opening and closing an opening between spokes, as a simple structure.

The purpose of the present disclosure is not limited to the purposes mentioned above, and other purposes not mentioned will be clearly understood by those skilled in the art from the description below.

According to an aspect of the present disclosure, a wheel for a vehicle includes: a wheel disk including a hub to be coupled to an axle, a plurality of spokes extending radially from the hub, and a wheel rim formed on an outside of the spokes; an opening and closing module provided between the spokes and coupled to the wheel disk; an opening and closing member controlling opening and closing of the opening formed in the opening and closing module; and a driving unit engaged to and driving the opening and closing member.

The opening and closing module may include: a module body fixed to an open space between the spokes; the opening formed in the module body; and an opening and closing member controlling the opening and closing of the opening.

The opening and closing member may include: a plurality of flaps rotatably coupled to the module body and configured for opening or closing the opening; and a connection link hinge-connecting the flaps to each other.

When the flaps are in a state of closing the opening, the flaps may be aligned to include the same size as the opening.

One side of the flaps may be hinged to the module body in a circumferential direction, and the other side, opposite to the one side in the circumferential direction, may be hinged to the connection link.

Two connection links may be provided to be coupled to first and second end portions of the flaps in the radial direction thereof.

When the flaps are in a state of closing the opening, the flaps may be aligned to be parallel to a surface of the module body, and when the flaps are in a state of opening the opening, the flaps may be aligned to be erected in an inclined state on the surface of the module body.

One surface of a main flap, provided outmost in the circumferential direction, among the flaps, may include a rounded protrusion having a first radius, and a main edge portion facing the one surface of the main flap, among the edge portions of the opening formed in the module body, may include a rounded recess portion having a second radius greater than or equal to the first radius.

The recess portion may include a first stopper extending inwardly of a virtual circle having the second radius at an external end portion in a thickness direction thereof.

The recess portion may include a second stopper extending outwardly of a virtual circle having the second radius at an internal end portion in a thickness direction thereof.

The driving unit may include: a push portion formed of shape memory alloy, a first end portion of which is fixed to the module body and a second end portion of which is connected to one of the flaps; and an elastic member returning the flaps opened by the push portion to original positions of the flaps.

The elastic member may have a first end portion fixed to the module body and a second end portion connected to an outermost one of the flaps.

The push portion may be deformed to have an 'L' shape by application of power (current) or heat generated inside the wheel disk.

Deformation force caused by the application of power (current) of the push portion or heat generated inside the wheel disk may be greater than elastic force of the elastic member.

The elastic member may be a leaf spring.

According to another aspect of the present disclosure, a vehicle includes: a body; and the wheel for a vehicle according to any one of claims 1 to 14 provided to enable the body to travel.

A disc brake may be provided inside the vehicle wheel, and the opening and the disc brake may be provided to overlap at least partially in the thickness direction thereof.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
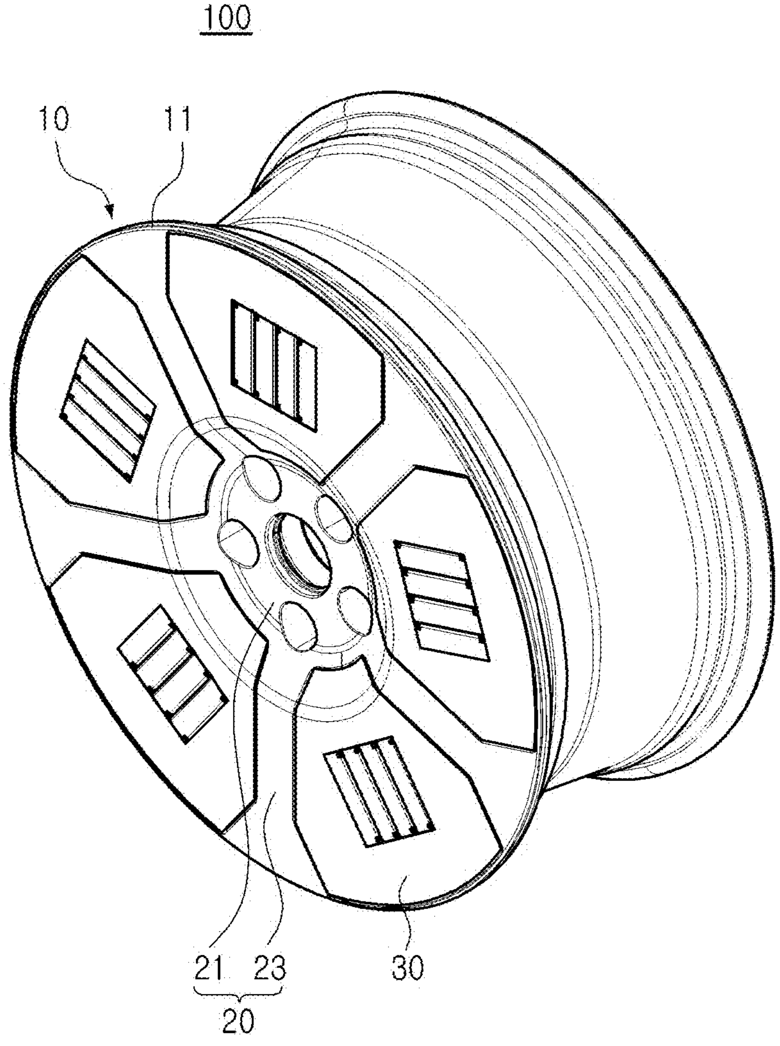
FIG. 1 and FIG. 2 are perspective views exemplarily illustrating a vehicle wheel according to an exemplary embodiment of the present disclosure, viewed from the outside thereof (FIG. 1 with openings closed and FIG. 2 with the openings open).

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

While the present disclosure may be modified in various ways and take on various alternative forms, specific exemplary embodiments thereof are illustrated in the drawings and described in detail below. However, it should be understood that there is no intent to limit the present disclosure to the forms disclosed, but on the other hand, the present disclosure covers all modifications, equivalents, and alternatives falling within the spirit and scope of the present disclosure.

It will be understood that, although the terms “first,” “second,” etc. may be used herein to describe various elements, these elements should not be limited by these terms. These terms are only used to distinguish one element from another. For example, a first element could be termed a second element, and a second element could similarly be termed a first element without departing from the scope of the present disclosure. As used herein, the term “and/or” includes any and all combinations of at least one of the associated listed items.

The terms, such as “unit, part, portion, etc.” may be used to describe various components, but the components should not be limited by these terms. The above terms may refer to not only physically/visually distinct components, but also to functions or components of a portion even if the corresponding portion is not clearly divided.

The terms used herein to describe exemplary embodiments of the present disclosure is not intended to limit the scope of the present disclosure. The articles “a,” and “an” are singular in that they have a single referent, however the use of the singular form in the present specification should not preclude the presence of more than one referent. In other words, elements of the present disclosure referred to in the singular may number one or more, unless the context clearly indicates otherwise. It will be further understood that the terms “comprise,” “comprising,” “include,” and/or “including,” when used herein, specify the presence of stated features, numbers, steps, operations, elements, and/or components but do not preclude the presence or addition of one or more other features, numbers, steps, operations, elements, components, and/or groups thereof.

Unless defined in a different manner, all terms used herein including technical and scientific terms have the same meanings as understood by those skilled in the art to which the present disclosure pertains. Such terms, as defined in generally used dictionaries, should be construed to have the same meanings as those of the contexts of the related art, and unless clearly defined in the application, they should not be construed to have ideally or excessively formal meanings.

In the present specification, vehicles refer to a variety of vehicles that move transported objects, such as people, animals, or goods, from a starting point to a destination. These vehicles are not limited to vehicles that run on roads or tracks. Furthermore, vehicles include not only those that use fossil fuels, such as gasoline, but also those that use electricity stored in batteries or the like and those that use future fuels, such as hydrogen.

In the description below, the terms “anterior,” “posterior,” “lateral,” “front,” “rear,” “up/down,” “above,” “upper,” “top,” “below” “lower” “bottom” “left/right” and the like are defined based on a vehicle or vehicle body. Furthermore, terms, such as first and second may be used to describe various components, but these components are not limited in order, size, location, or importance by terms, such as first and second and named for the sole purpose of distinguishing one component from another.

Hereinafter, various exemplary embodiments of the present disclosure are described in more detail with reference to the accompanying drawings.

Figure 2:
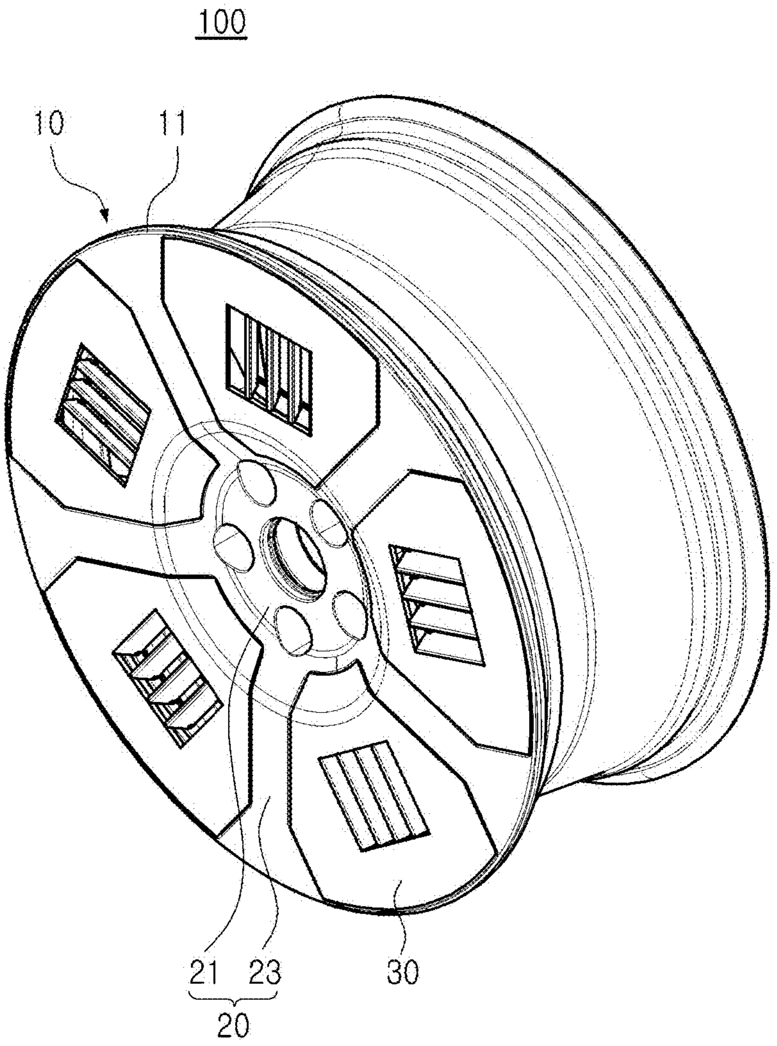

FIG. 1 and FIG. 2 are perspective views exemplarily illustrating a vehicle wheel according to an exemplary embodiment of the present disclosure, viewed from the outside thereof (FIG. 1 with openings closed and FIG. 2 with the openings open).

Referring to FIG. 1 and FIG. 2, a vehicle wheel 100 according to an exemplary embodiment of the present disclosure is connected to an axle of a vehicle and may be applied to, for example, a wheel/tire assembly of a passenger vehicle. The wheel 100 may include a wheel rim 10 and a wheel disk 20.

In the description of the exemplary embodiment of the present disclosure, a radial direction may be a direction from a hub 21 toward a rim flange 11, a circumferential direction may be a direction in which the vehicle wheel 100 rotates, and a thickness direction may be a direction in which the axle coupled to the vehicle wheel 100 extends.

The wheel rim 10 is a portion on which a tire (not illustrated in the drawing) is mounted and includes rim flanges 11 on both sides thereof in a width direction of the vehicle. The wheel disk 20 includes a hub 21 coupled to the axle at the internal center portion of the wheel rim 10 and a plurality of spokes 23 radially connecting the hub 21 to the rim flange 11.

Here, the wheel disk 20 forms open spaces 25 including a set area between the spokes 23, and the spokes 23 have a width constant or gradually decreasing or increasing from the rim flange 11 toward the hub 21. Accordingly, the open space 25 may have a width constant or gradually narrowing from the rim flange 11 toward the hub 21. In the drawings of the exemplary embodiment of the present disclosure, for convenience of illustration, only the shape of the open space 25 including the width increasing in the radial direction is illustrated, but is not limited thereto.

Because the basic configuration of the wheel rim 10 and the wheel disk 20 is known to those skilled in the art, a detailed description thereof is omitted in the present specification.

The vehicle wheel 100 according to an exemplary embodiment of the present disclosure may include an opening and closing module 30 separately manufactured and provided in the open space 25. Furthermore, the opening and closing module 30 includes an opening 31*b* through which air may pass, and the opening 31*b* includes an opening and closing member 32 controlling opening and closing of the opening 31*b* to variously adjust opening and closing of the opening 31*b*. The opening and closing module 30 may be provided in the same shape as the open space 25. FIG. 1 illustrates a state in which the opening 31*b* is closed, and FIG. 2 illustrates a state in which the opening 31*b* is open.

In other words, because the opening and closing module 30 to be provided in the wheel disk 20 may be separately manufactured and provided in the vehicle wheel 100 of the exemplary embodiment of the present disclosure, manufacturing convenience may be improved.

Referring further to FIG. 3, FIG. 4, FIG. 5, FIG. 6, FIG. 7, FIG. 8, FIG. 9, FIG. 10 and FIG. 11, the vehicle wheel 100 according to an exemplary embodiment of the present disclosure may include the opening and closing module 30 separately manufactured and provided in the open space 25. Furthermore, the opening and closing module 30 includes the opening 31*b* through which air may pass, and the opening 31*b* includes the opening and closing member 32 controlling the opening and closing of the opening 31*b* so that opening and closing of the opening 31*b* may be variously adjusted.

Figure 3:
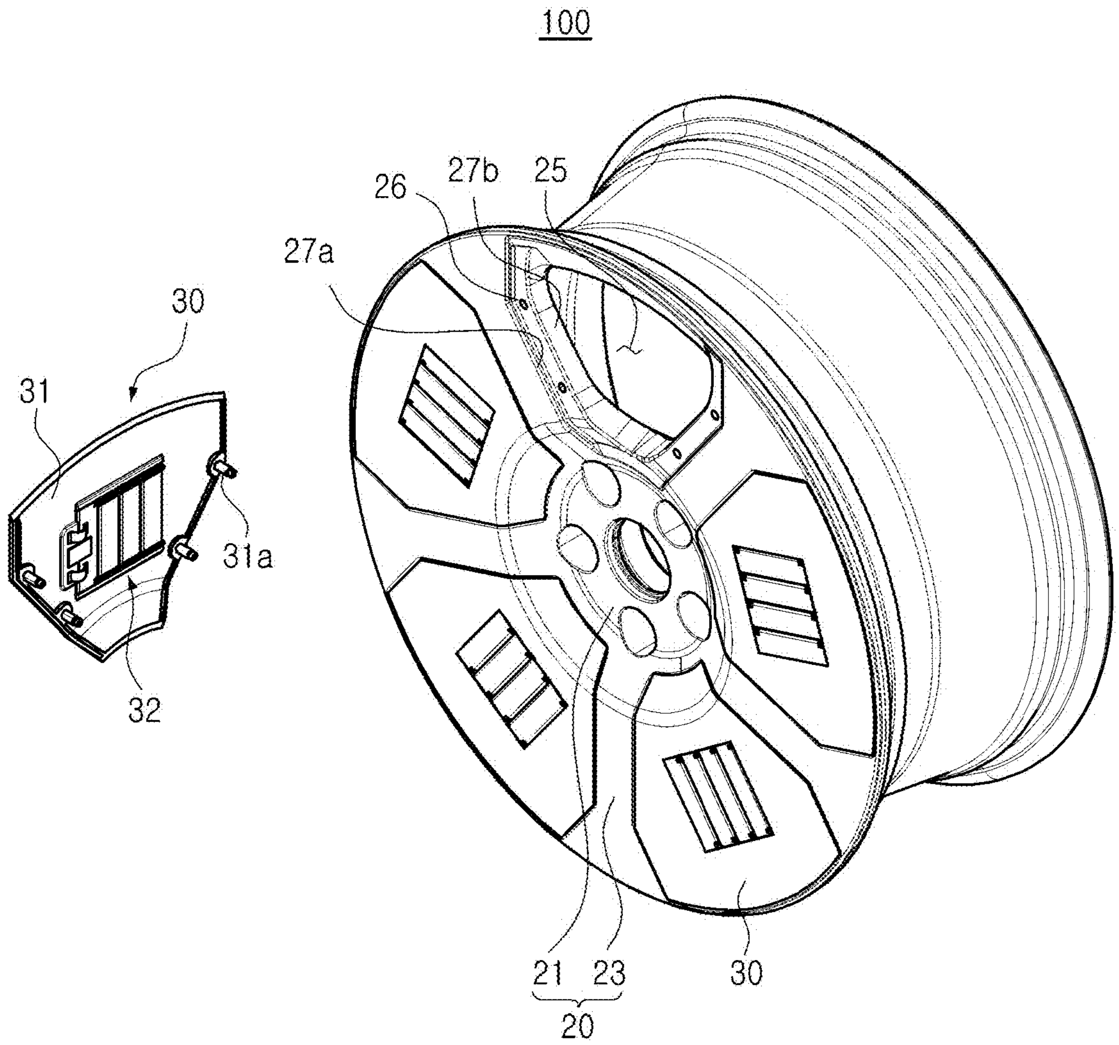
FIG. 3 is a partially exploded perspective view of only one opening and closing module separated from a vehicle wheel according to an exemplary embodiment of the present disclosure.

Referring to FIG. 3, the open space 25 is provided between the spokes 23 of the wheel disk 20, and the opening and closing module 30 may be provided in the open space 25. The opening and closing module 30 may include a module body 31 forming a body, and the module body 31 may be provided in the open space 25. The module body 31 and the open space 25 may have the same shape.

The wheel disk 20 may include a plurality of insertion recesses 26 along the edge portion of the open space 25. Furthermore, the opening and closing member 32, in particular, the module body 31, may include a plurality of insertion protrusions 31*a* along the edge portion, and the insertion protrusions 31*a* may be inserted into the insertion recesses 26 so that the opening and closing member 32 may be firmly fixed to the wheel disk 20. The insertion recesses 26 and the insertion protrusions 31*a* may be provided in the same number and locations. Furthermore, in the exemplary embodiment of the present disclosure, a structure in which the insertion recess 26 is provided in the open space 25 and the insertion protrusion 31*a* is provided in the module body 31 is described. However, this is an example, and insertion protrusion may be provided in the open space 25 and the insertion recess may be provided in the module body 31.

The wheel disk 20 may include a first step 27*a* along the edge portion of the open space 25. Furthermore, the module body 31 may be inserted into the open space 25 so that a first fitting portion 31*d*, which is the edge portion of the module body 31, is caught by the first step 27*a*. The first step 27*a* and the first fitting portion 31*d* may include the same shape and height in the thickness direction provided along the edge portion, and accordingly, an external surface of the wheel disk 20 and the opening and closing module 30, specifically, an external surface of the module body 31, may be provided (finished) side by side.

The wheel disk 20 may include a second step 27*b* inside the first step 27*a* along the edge portion of the open space 25. Furthermore, the module body 31 may include a second fitting portion 31*e* inside the first fitting portion 31*d*, which is the edge portion of the module body 31, and the module body 31 may be inserted into the open space 25 so that the second fitting portion 31*e* may be caught by the second step 27*b*. The second step 27*b* and the second fitting portion 31*e* may include the same shape along the edge portion.

In the present manner, regarding the coupling to the open space 25 in the wheel disk 20, the first step 27*a* and the first fitting portion 31*d* and the second step 27*b* and the second fitting portion 31*e* are doubly coupled, obtaining excellent coupling power.

The vehicle wheel 100 of the exemplary embodiment of the present disclosure may include the opening and closing module 30 provided in the wheel disk 10, and opening and closing power may be provided to the opening and closing module 30 by the driving unit 37. Power of the driving unit 37 may be provided by applying separate power (current) or by heat generated inside the wheel disk 10 without a separate power source.

The wheel disk 10 may include a hub 21 to be coupled to the axle, a plurality of spokes 23 extending radially from the hub 21, and the wheel rim 10 provided on the outside of the spokes 23. Furthermore, the opening and closing module 30 may be coupled to the wheel disk 10 to be provided between the spokes 23 and may include the opening and closing member 32 controlling the opening and closing of the opening 31*b* provided in the opening and closing module 30. Also, opening and closing power may be provided to the opening and closing module 30 by the driving unit 37.

Figure 4:
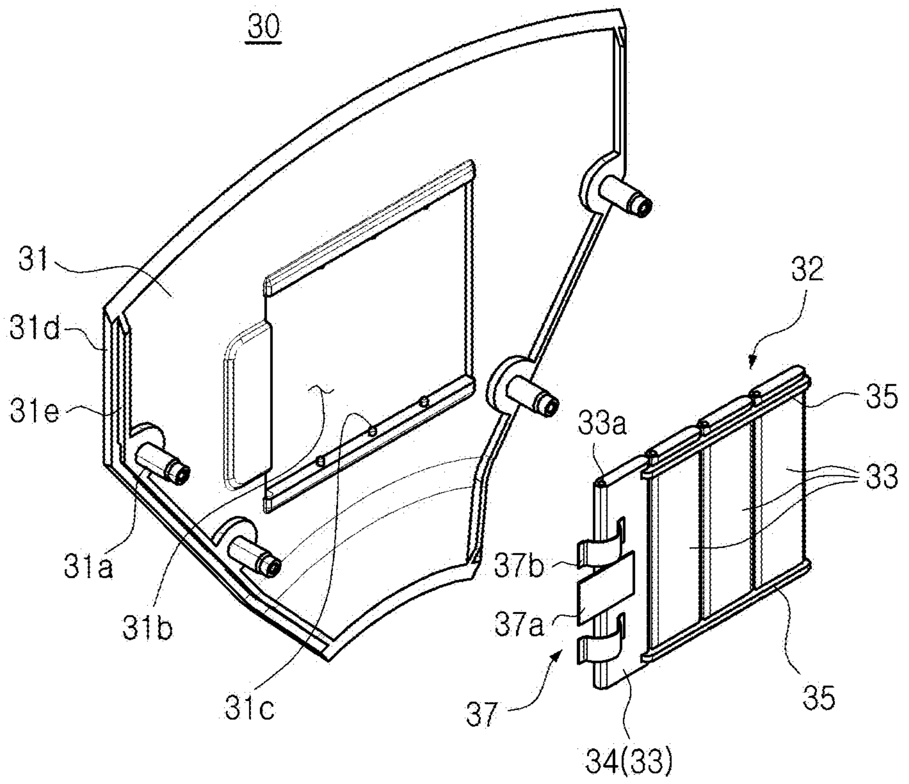
FIG. 4 is a partially exploded perspective view of an opening and closing module of a vehicle wheel according to an exemplary embodiment of the present disclosure.
Figure 5:
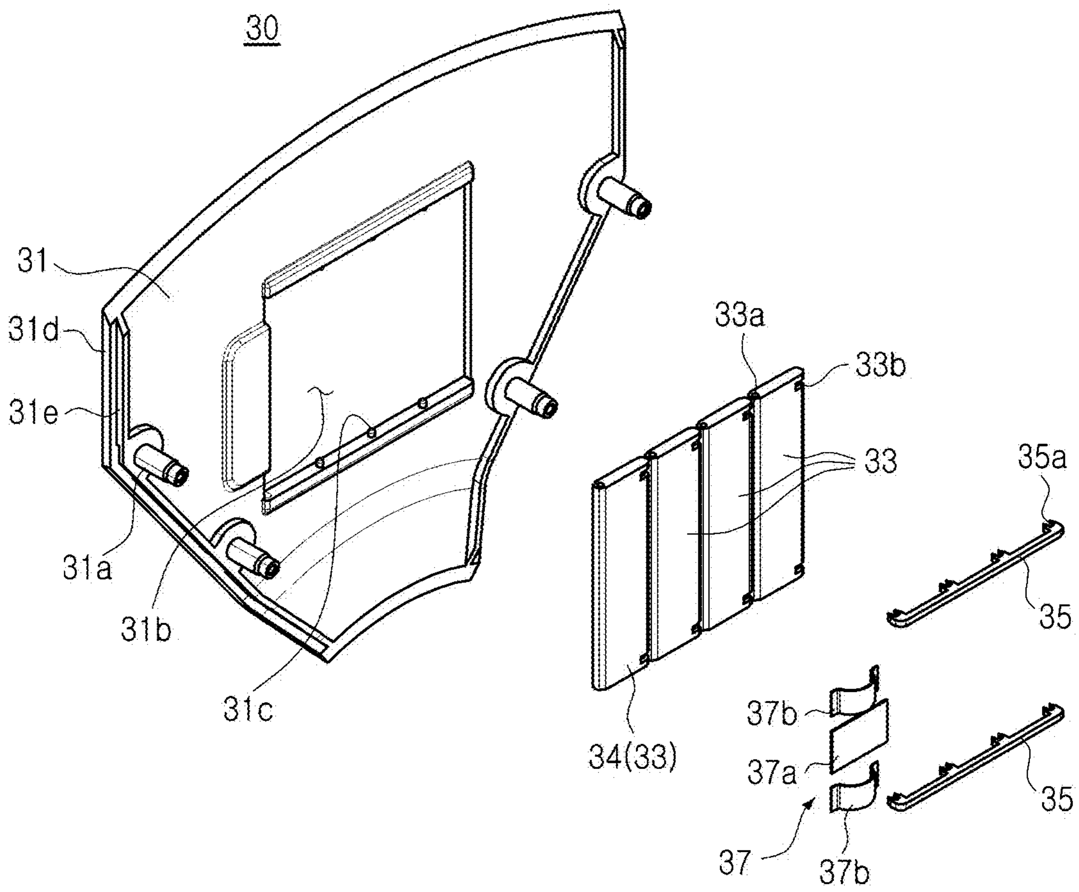
FIG. 5 is an exploded perspective view of an opening and closing module of a vehicle wheel according to an exemplary embodiment of the present disclosure.
Figure 6:
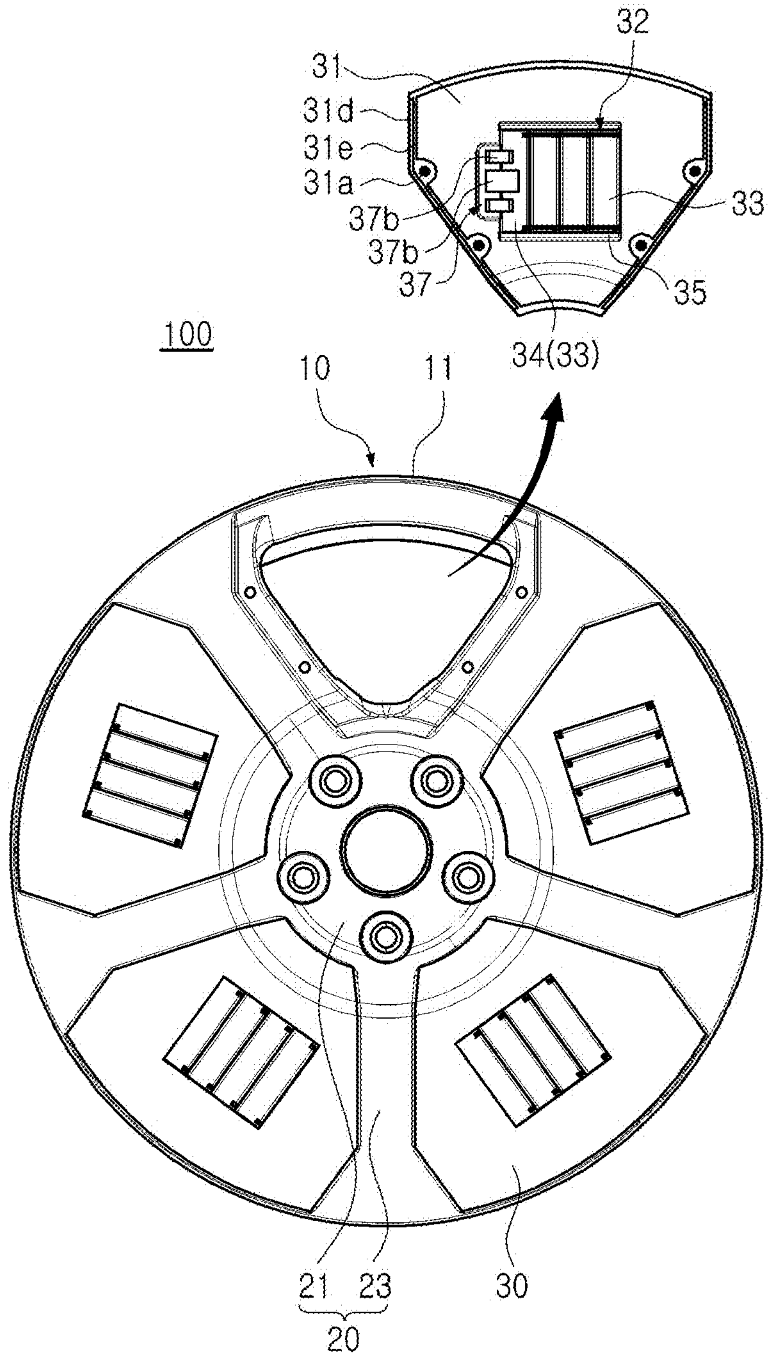
FIG. 6 and FIG. 7 are plan views of a vehicle wheel according to an exemplary embodiment of the present disclosure, viewed from the outside thereof (FIG. 6 with openings closed and FIG. 7 with the openings open).
Figure 7:
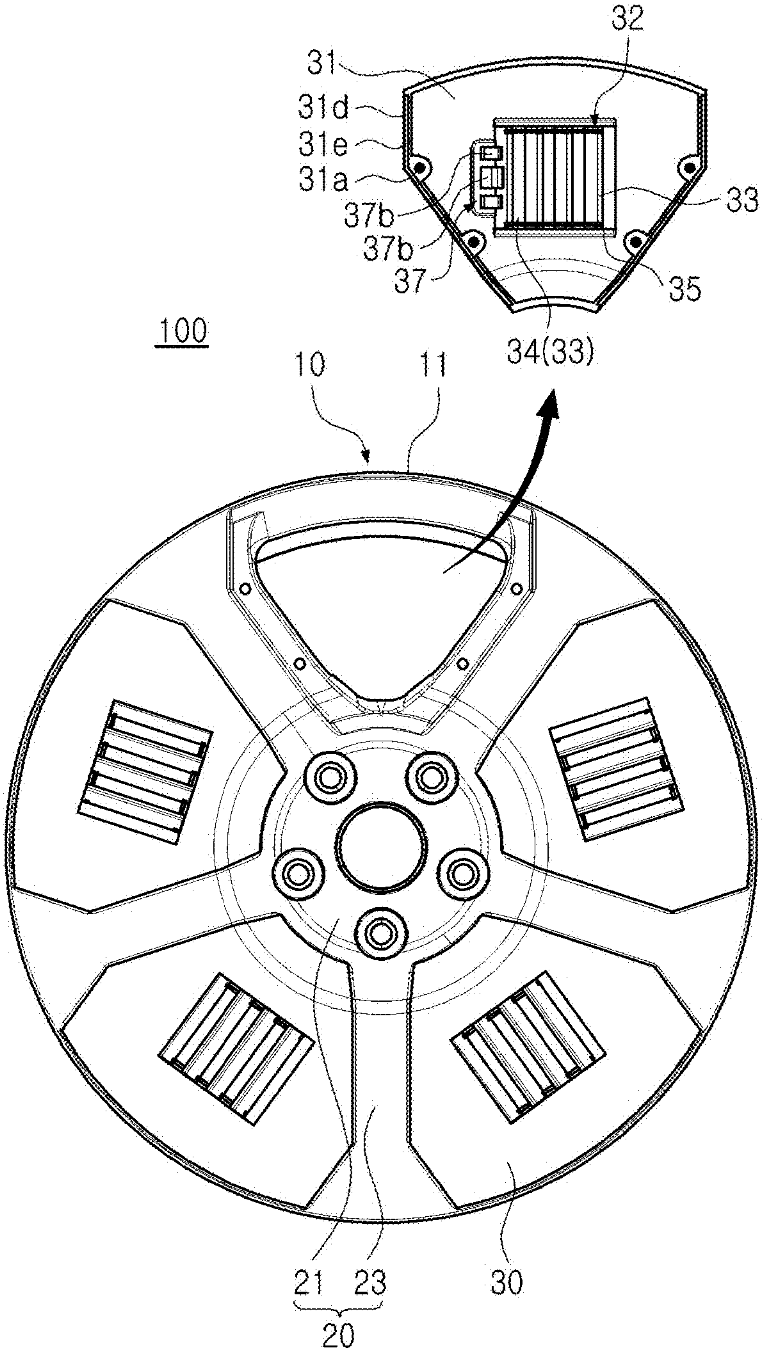

Referring to FIG. 4 and FIG. 5, an exploded perspective view of the opening and closing module 30 of a vehicle wheel according to an exemplary embodiment of the present disclosure is illustrated.

The opening and closing module 30 of the exemplary embodiment of the present disclosure may include the module body 31 fixed to the open space 25 between the spokes 23, the opening 31*b* provided in the module body 31, and the opening and closing member 32 adjusting opening and closing of the opening 31*b*. That is, the exemplary embodiment of the present disclosure may include the module body 31 fixed to the open space 25 between the spokes 23, and the module body 31 may include the opening 31*b* through which cooling air passes.

The opening and closing member 32 of the exemplary embodiment of the present disclosure may have various structures. For example, a flap structure rotatably provided in the opening 31*b*, a slider structure configured for sliding insertion (both slide movement in the circumferential direction or slide movement in the radial direction, etc. may be made) are all applicable.

Because the exemplary embodiment of the present disclosure includes a structure in which the opening and closing module 30 provided on the wheel disk 10 is manufactured separately, the opening and closing module 30 may be very conveniently designed in various structures and may be easily applied to the wheel disk 10.

Hereinafter, the structure of the flap 33 rotatably provided in the opening 31*b* is mainly described as an example of the opening and closing member 32 applied to the exemplary embodiment of the present disclosure.

The opening and closing member 32 of the exemplary embodiment of the present disclosure may include a plurality of flaps 33 opening or closing the opening 31*b* and rotatably provided on the module body 31. Furthermore, the plurality of flaps 33 may be hinged to each other by a connection link 35. The plurality of flaps 33 may be hinged to each other by the connection link 35 so that the rotation of the flaps 33 may be interlocked as a whole.

When the flaps 33 are in a state of closing the opening 31*b*, the flaps 33 may all be unfolded and aligned to have the same size as the opening 31*b*. Furthermore, one side of the flaps 33 in the circumferential direction may be hinged to the module body 31, and the other side, which is opposite to one side in the circumferential direction, may be hinged to the connection link 35.

As a result, a structure is formed in which one side of the plurality of flaps 33 is hinged to the module body 31 and the other side of the plurality of flaps 33 is hinged to the connection link 35. Accordingly, the plurality of flaps 33 may be interlocked to be integrally moved by the connection link 35, and the plurality of flaps 33 may rotate by driving force provided from the driving unit 37.

For example, two connection links 35 may be provided to be coupled to both end portions of the flaps 33 in the radial direction thereof. Furthermore, when the flaps 33 are in a state of closing the opening 31*b*, the flaps 33 may be aligned to be parallel to the surface of the module body 31, and when the flaps 33 are in a state of opening the opening 31*b*, the flaps 33 may be aligned to be erected in an inclined state on the surface of the module body 31. When the flaps 33 are erected in an inclined state on the surface of the module body 31, air may be more easily introduced when the vehicle wheel 100 rotates.

One side of the plurality of flaps 33 may be hinged to the module body 31. As an exemplary embodiment of the present disclosure, the flap 33 may include a hinge recess 33*a* and the module body 31 may include a hinge protrusion 31*c*, so that the hinge protrusion 31*c* may be rotatably hinged to the hinge recess 33*a*. Each individual flap 33 and the module body 31 may include two hinge recesses 33*a* and the hinge protrusion 31*c* at the top portion and bottom portion in the radial direction, respectively.

In the exemplary embodiment of the present disclosure, the structure in which the flap 33 includes the hinge recess 33*a* and the module body 31 includes the hinge protrusion 31*c* is provided as an exemplary embodiment of the present disclosure, but the flap 33 may include a hinge protrusion and the module body 31 may include a hinge recess or a structure in which they are mixed with each other may also be provided.

The other side of the plurality of flaps 33 is hinged to the connection link 35 and may be driven in conjunction with each other. As an exemplary embodiment of the present disclosure, the plurality of flaps 33 may be hinged to each other by a connection link 35 provided to extend in the circumferential direction thereof. The flap 33 may include a link hinge protrusion 33*b*, and the connection link 35 may include a link hinge recess 35*a*, so that the link hinge protrusion 33*b* may be rotatably hinged to the link hinge recess 35*a*. Each individual flap 33 may include two link hinge protrusions 33*b* at the top portion and bottom portion in the radial direction, and two connection links 35 may be provided and hinged to the top portion and bottom portion of the flaps 33 in the radial direction, respectively.

In the exemplary embodiment of the present disclosure, the structure in which the flap 33 includes the link hinge protrusion 33*b* and the connection link 35 includes the link hinge recess 35*a* is provided as an exemplary embodiment of the present disclosure, but the flap 33 may include a link hinge recess and the connection link 35 may include link hinge protrusion, or a structure in which they are mixed together may also be provided.

Figure 8:
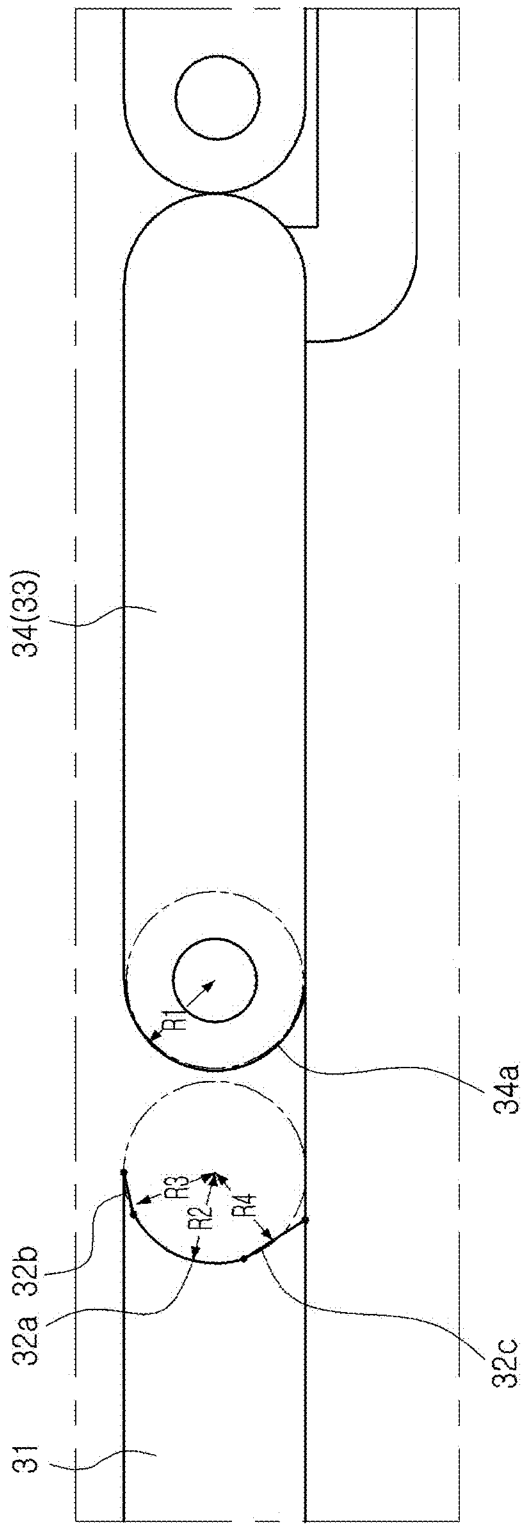
FIG. 8 is a reference diagram illustrating a size of a hinge portion in which a module body and a flap forming an opening and closing module of a vehicle wheel relatively rotate according to an exemplary embodiment of the present disclosure.
Figure 9:
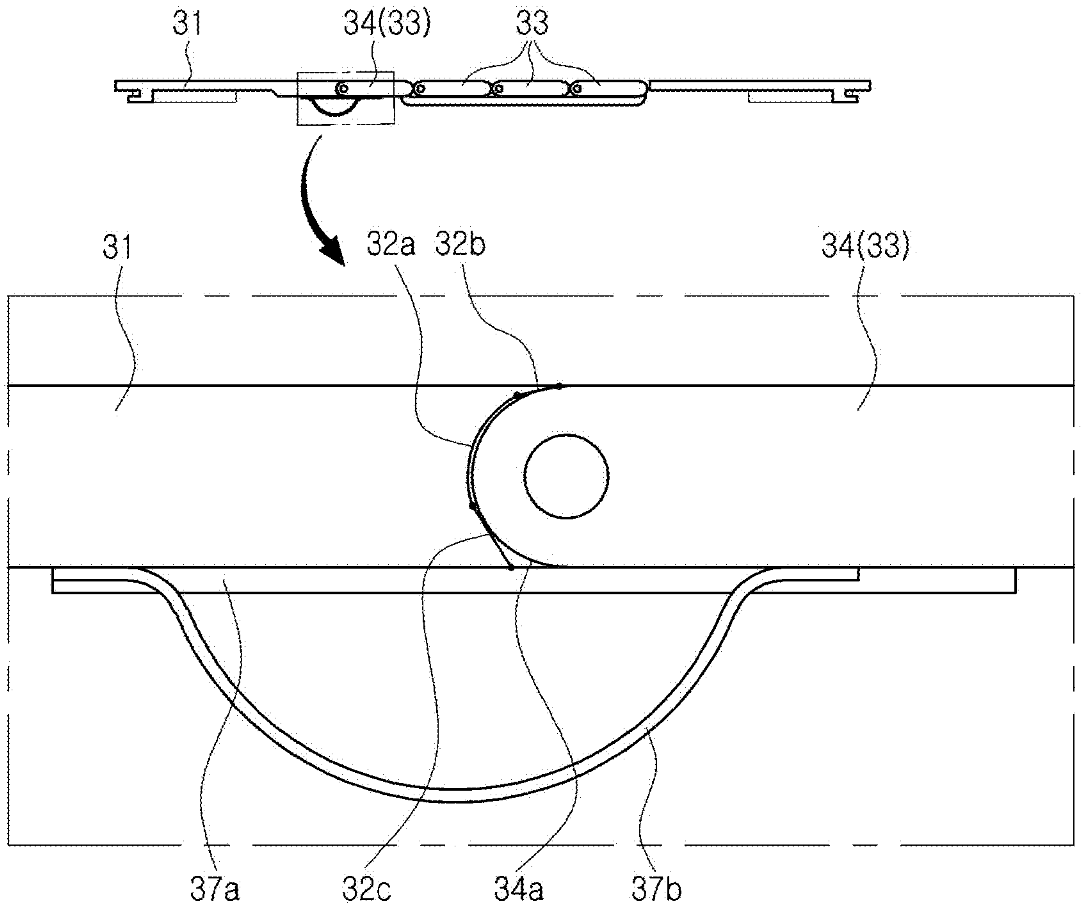
FIG. 9 is a reference diagram illustrating a structure in which a flap is caught by a first stopper of a module body in an opening and closing module of a vehicle wheel according to an exemplary embodiment of the present disclosure.
Figure 10:
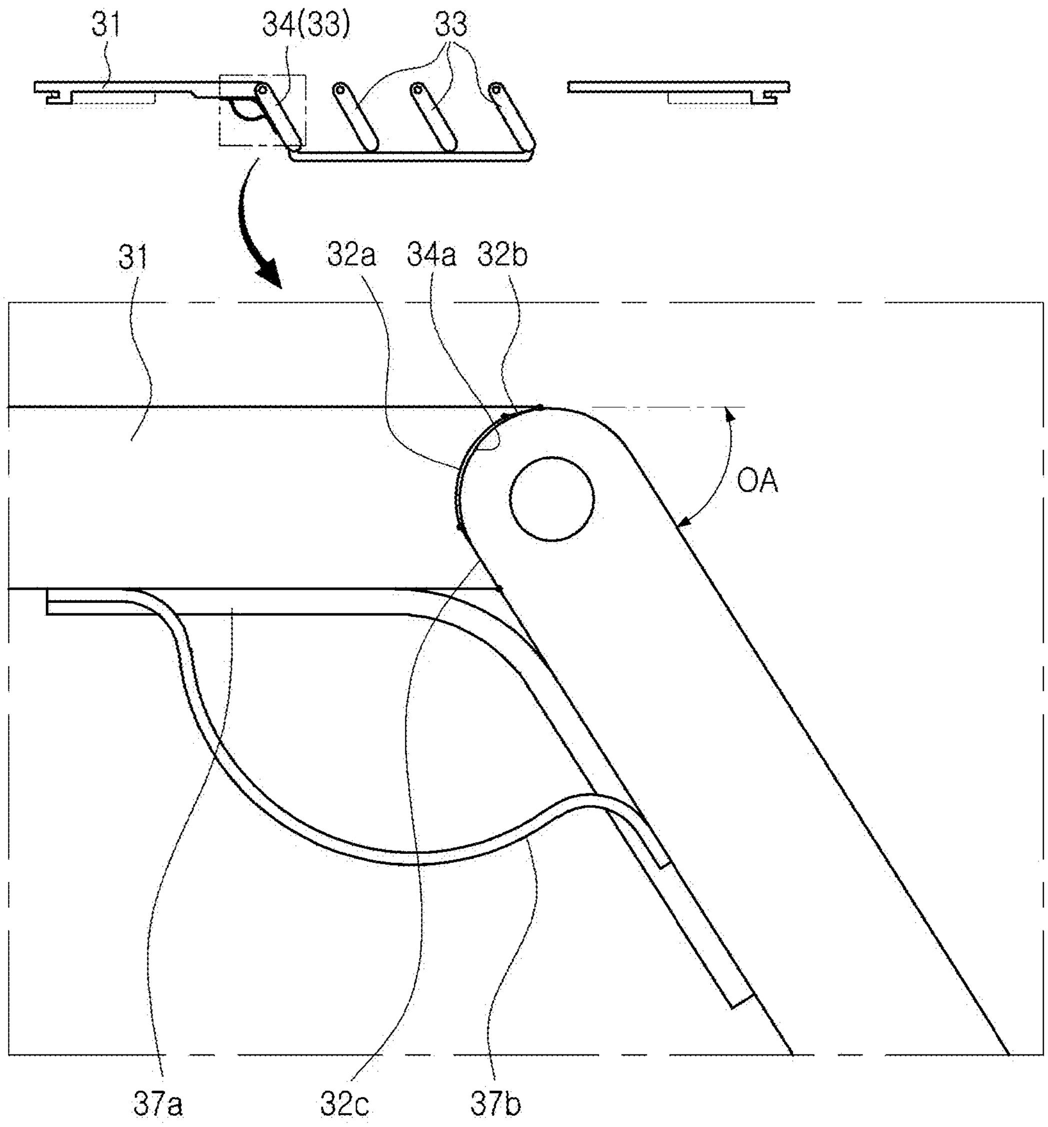
FIG. 10 is a reference diagram illustrating a structure in which a flap is caught by a second stator of a module body in an opening and closing module of a vehicle wheel according to an exemplary embodiment of the present disclosure.

Referring further to FIG. 8, FIG. 9 and FIG. 10, in the exemplary embodiment of the present disclosure, one surface of a main flap 34, provided outmost in the circumferential direction among the flaps 33 may include a rounded protrusion 34*a* having a first radius R1, and a main edge portion facing one surface of the main flap 34, among the edge portions of the opening 31*b* provided in the module body 31, include a rounded recess portion 32*a* having a second radius R2 greater than or equal to the first radius R1. The protrusion 34*a* may be rotated inside the recess portion 32*a* (of course, the recess portion 32*a* and the protrusion 34*a* are not in contact with each other but are opposed to each other at a predetermined distance and may be rotated relative to each other). In the drawings, an example in which the first radius R1 and the second radius R2 are the same will be described.

The main edge portion includes the rounded recess portion 32*a* having the second radius R2, a first stopper 32*b* provided at an external end portion of the recess portion 32*a* in the thickness direction, and a second stopper 32*c* provided at an internal end portion of the recess portion 32*a* in the thickness direction thereof.

The recess portion 32*a* may be provided in a round shape including a radius of the same size as the protrusion 34*a* to facilitate rotation of the protrusion 34*a*.

Also, in the recess portion 32*a*, the first stopper 32*b* extending inwardly of a virtual circle having the second radius R2 may be provided at an external end portion in the thickness direction, and the second stopper 32*c* extending outwardly of a virtual circle having the second radius R2 may be provided at an internal end portion in the thickness direction thereof.

The first stopper 32*b* and the second stopper 32*c* may include a flat internal surface facing the protrusion 34*a*, and the rotating main flap 34 may be caught by the first stopper 32*b* and the second stopper 32*c*.

The first stopper 32*b* may extend inwardly of a virtual circle having the second radius R2 at the external end portion in the thickness direction and may prevent the main flap 34 aligned flat with the module body 31 from being rotated outwardly in the radial direction any Furthermore, a distance R3 from the center portion of the virtual circle having the second radius R2 to the internal surface of the first stopper 32*b* may be smaller than the second radius R2.

The second stopper 32*c* may extend to the outside of a virtual circle having the second radius R2 at the internal end portion in the thickness direction and may set a limit of an opening angle so that the main flap 34 is erected in a state of being inclined on the surface of the module body 31 when rotated inwardly of the module body 31 to be opened. That is, an opening angle limit (e.g., acute angle) of a predetermined angle at which the main flap 34 is erected on the surface of the module body 31 may be set, and when the main flap 34 is opened up to the corresponding limit opening angle OA, the main flap 34 may be prevented from rotating inwardly in the radial direction any Furthermore, a distance R4 from the center portion of the virtual circle having the second radius R2 to the internal surface of the second stopper 32*c* may be greater than the second radius R2.

The driving unit 37 may drive the opening and closing member 32.

The opening and closing member 32 of the exemplary embodiment of the present disclosure may include various structures, for example, a flap structure rotatably provided in the opening 31*b*, a slider structure configured for sliding insertion (both slide movement in the circumferential direction or slide movement in the radial direction, etc. may be made). Accordingly, in the exemplary embodiment of the present disclosure, the driving unit may include various power units. For example, rotational driving of a flap by a motor, linear driving of a slider by a linear motor, etc. are all applicable.

In the exemplary embodiment of the present disclosure, as an exemplary embodiment of the present disclosure, a rotation drive structure of a flap by pushing force from a push portion 37*a* included in the driving unit 37 is mainly described. In detail, a structure using a push portion 37*a* formed of a shape memory alloy material is described.

The driving unit 37 of various exemplary embodiments of the present disclosure may include the push portion 37*a* formed of shape memory alloy, one end portion of which is fixed to the module body 31 and the other end portion connected to one of the flaps 33, and an elastic member 37*b* returning the opened flaps 33 opened by the push portion 37*a* to original positions of the flaps.

One end portion of the elastic member 37*b* may be fixed to the module body 31 and the other end portion may be connected to the outermost one of the flaps 33, for example, the main flap 34. The elastic member 37*b* may be a spring, and may be a leaf spring.

One end portion of the push portion 37*a* may be fixed to the module body 31 and the other end portion may be connected to the outermost one of the flaps 33, for example, the main flap 34. The shape of the push portion 37*a* may be deformed by the application of power (current) or heat generated inside the wheel disk. For example, the push portion 37*a* may be bent by application of power (current) or heat generated inside the wheel disk, and may be deformed into an 'L' shape.

Furthermore, as the shape of the push portion 37*a* is deformed, the main flap 34 connected thereto may be rotated and all of the rotatably linked flaps 33 may be opened.

In another exemplary embodiment of the present disclosure, the push portion 37*a* may be driven by applying separate power (current).

Furthermore, the push portion 37*a* may be automatically operated by heat generated inside the wheel disk. For example, when heat generated inside the wheel disk is above a predetermined temperature, the shape of the push portion 37*a* formed of shape memory alloy may be set to be deformed. For example, the push portion 37*a* formed of shape memory alloy may be set to be bent or deformed into an 'L' shape by heat having a temperature above the predetermined temperature. Accordingly, the push portion 37*a* may be provided to overlap, that is, face, the brake disc 200, which is a heat source, in the thickness direction (see FIG. 11).

Furthermore, deformation force caused by the application of power (current) to the push portion 37*a* or heat generated inside the wheel disk may be greater than elastic restoring force of the elastic member 37*b*.

Figure 11:
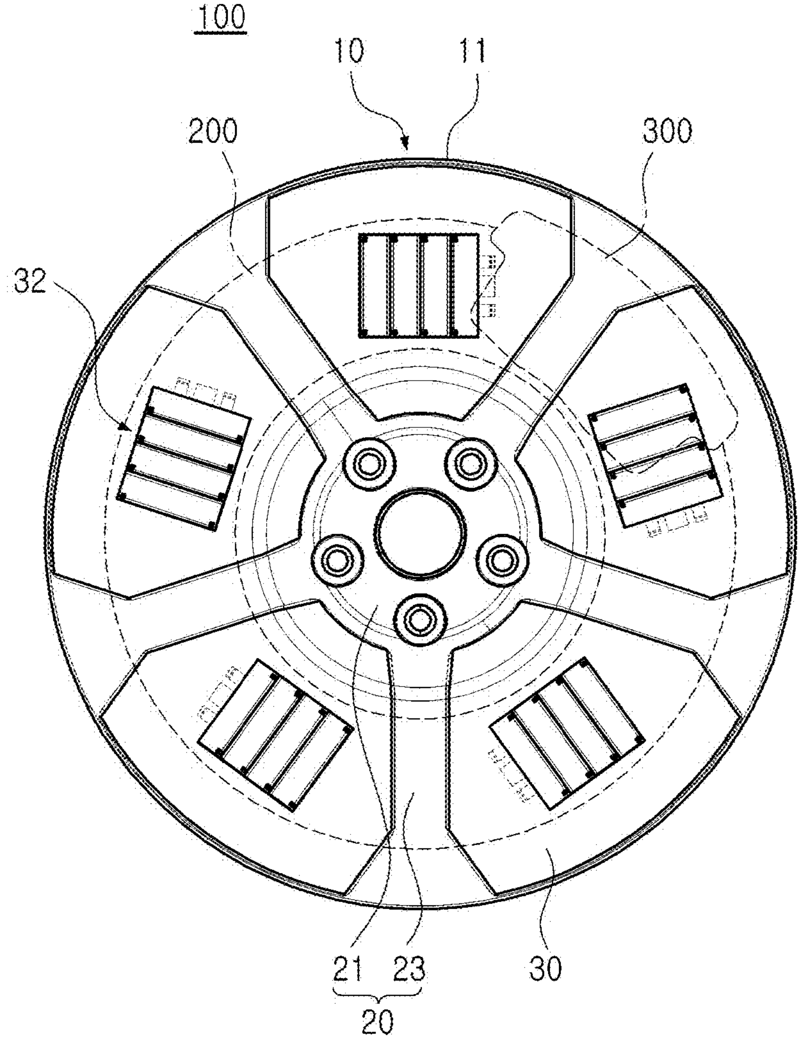
FIG. 11 is a reference diagram illustrating a shape of a caliper and a brake disc provided on a vehicle wheel according to an exemplary embodiment of the present disclosure.

Next, as illustrated in FIG. 11, when the vehicle wheel 100 of the exemplary embodiment of the present disclosure is provided in a vehicle, the caliper 200 and the brake disc 300 may be provided to be adjacent to each other. Furthermore, in the exemplary embodiment of the present disclosure, to improve cooling efficiency, the opening 31*b* and the disc brake 300 may be provided to overlap at least partially in the thickness direction. Furthermore, the push portion 37*a* may be automatically operated by heat generated inside the wheel disk, and thus, for the present reason, the push portion 37*a* may be provided to sufficiently overlap, that is, face, the brake disc 200, which is a heat source, in the thickness direction thereof.

Figure 12:
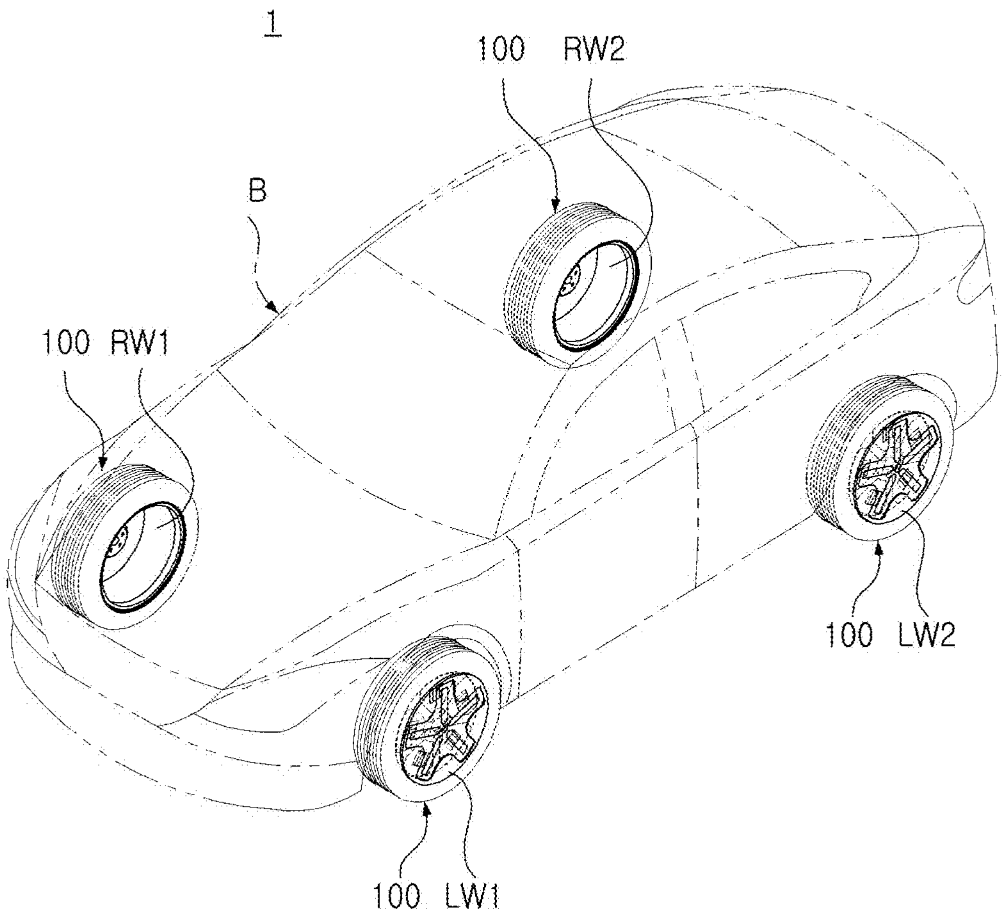
FIG. 12 is a reference diagram illustrating a vehicle to which a vehicle wheel according to an exemplary embodiment of the present disclosure is applied.

FIG. 12 is a reference diagram illustrating a vehicle in which the vehicle wheel 100 is provided according to an exemplary embodiment of the present disclosure.

The vehicle 1 according to an exemplary embodiment of the present disclosure includes at least a body B and left wheels LW-LW1 and LW2 and right wheels RW-RW1 and RW2 provided on the body B. Furthermore, the vehicle 1 of the exemplary embodiment of the present disclosure may include a wheel 100 including the opening and closing member 32 configured for opening or closing the opening 25 to facilitate cooling of a brake disc while driving.

Here, when the vehicle wheel 100 of the exemplary embodiment of the present disclosure is provided in the vehicle, the caliper 300 and the brake disc 200 may be provided to be adjacent to each other. Furthermore, in the exemplary embodiment of the present disclosure, to improve cooling efficiency, the opening 31*b* and the disc brake 200 may be provided to overlap at least at least partially in the thickness direction. Furthermore, the push portion 37*a* may be automatically operated by heat generated inside the wheel disk, and thus, for the present reason, the push portion 37*a* may be provided to sufficiently overlap, that is, face, the brake disc 200, which is a heat source, in the thickness direction thereof.

The vehicle wheel according to an exemplary embodiment of the present disclosure may easily open or close the openings between spokes using the opening and closing device including a simple structure, improving the aerodynamic performance and fuel efficiency of the vehicle.

Furthermore, because the vehicle wheel according to an exemplary embodiment of the present disclosure includes the opening and closing module which is manufactured separately and easily and conveniently provided, providing convenience in manufacturing the product.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms “upper”, “lower”, “inner”, “outer”, “up”, “down”, “upwards”, “downwards”, “front”, “rear”, “back”, “inside”, “outside”, “inwardly”, “outwardly”, “interior”, “exterior”, “internal”, “external”, “forwards”, and “backwards” are used to describe features of the exemplary embodiments with reference to the positions of such features as displayed in the figures. It will be further understood that the term “connect” or its derivatives refer both to direct and indirect connection.

The term “and/or” may include a combination of a plurality of related listed items or any of a plurality of related listed items. For example, “A and/or B” includes all three cases such as “A”, “B”, and “A and B”.

In exemplary embodiments of the present disclosure, “at least one of A and B” may refer to “at least one of A or B” or “at least one of combinations of at least one of A and B”. Furthermore, “one or more of A and B” may refer to “one or more of A or B” or “one or more of combinations of one or more of A and B”.

In the present specification, unless stated otherwise, a singular expression includes a plural expression unless the context clearly indicates otherwise.

In the exemplary embodiment of the present disclosure, it should be understood that a term such as “include” or “have” is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A wheel for a vehicle, the wheel comprising:

a wheel disk including a hub, a plurality of spokes extending in a radial direction from the hub, and a wheel rim formed on an outside of the spokes;

an opening and closing module provided between the spokes and coupled to the wheel disk, wherein the opening and closing module includes an opening;

an opening and closing member controlling opening and closing of the opening formed in the opening and closing module; and a driving unit engaged to the opening and closing member and configured for driving the opening and closing member, wherein the opening and closing member fully closes the opening.

2. The wheel of claim 1, wherein the opening and closing module includes:

a module body fixed to an open space between the spokes;

the opening formed in the module body; and the opening and closing member controlling the opening and closing of the opening.

3. The wheel of claim 2, wherein the opening and closing member includes:

a plurality of flaps rotatably coupled to the module body and configured for opening or closing the opening; and a connection link hinge-connecting the flaps to each other.

4. The wheel of claim 3, wherein, when the flaps are in a state of closing the opening, the flaps are aligned to include a same size as the opening.

5. The wheel of claim 3, wherein a first side of the flaps is hinged to the module body in a circumferential direction, and a second side of the flaps, opposite to the first side in the circumferential direction, is hinged to the connection link.

6. The wheel of claim 5, wherein two connection links are provided to be coupled to first and second end portions of the flaps in the radial direction.

7. The wheel of claim 3, wherein, when the flaps are in a state of closing the opening, the flaps are aligned to be parallel to a surface of the module body, and when the flaps are in a state of opening the opening, the flaps are aligned to be erected in an inclined state on the surface of the module body.

8. The wheel of claim 7, wherein one surface of a main flap, provided outmost in a circumferential direction, among the flaps, includes a rounded protrusion having a first radius, and a main edge portion facing the one surface of the main flap, among edge portions of the opening formed in the module body, includes a rounded recess portion having a second radius greater than or equal to the first radius.

9. The wheel of claim 8, wherein the recess portion includes a first stopper extending inwardly of a virtual circle having the second radius at an external end portion of the recess portion in a thickness direction thereof.

10. The wheel of claim 8, wherein the recess portion includes a second stopper extending outwardly of a virtual circle having the second radius at an internal end portion of the recess portion in a thickness direction thereof.

11. The wheel of claim 3, wherein the driving unit includes:

a push portion formed of shape memory alloy, a first end portion of which is fixed to the module body and a second end portion of which is connected to one of the flaps; and an elastic member elastically biasing the flaps and returning the flaps opened by the push portion to original positions of the flaps.

12. The wheel of claim 11, wherein the elastic member has a first end portion fixed to the module body and a second end portion connected to an outermost one of the flaps.

13. The wheel of claim 11, wherein the push portion is deformed to have an 'L' shape by application of power or heat generated inside the wheel disk, to the push portion.

14. The wheel of claim 13, wherein deformation force caused by the application of the power or the heat generated inside the wheel disk to the push portion is greater than elastic force of the elastic member.

15. The wheel of claim 11, wherein the elastic member is a leaf spring.

16. The wheel of claim 2, wherein the wheel disk includes one of an insertion recess and an insertion protrusion in an edge portion of the open space and the module body includes another of the insertion recess and the insertion protrusion, and wherein the insertion protrusion is inserted into the insertion recess.

17. The wheel of claim 2, wherein the wheel disk includes at least a step along an edge portion of the open space, wherein the module body includes at least a fitting portion, and wherein the module body is inserted into the open space so that the at least a fitting portion of the module body is caught by the at least a step of the wheel disk.

18. A vehicle comprising:

a body; and the wheel for the vehicle of claim 1 provided to enable the body to travel.

19. The vehicle of claim 18, wherein a disc brake is provided inside the wheel, and the opening and the disc brake are provided to overlap at least partially in a thickness direction.

20. A wheel for a vehicle, the wheel comprising:

a wheel disk including a hub, a plurality of spokes extending in a radial direction from the hub, and a wheel rim formed on an outside of the spokes;

an opening and closing module provided between the spokes and coupled to the wheel disk, wherein the opening and closing module includes an opening;

an opening and closing member controlling opening and closing of the opening formed in the opening and closing module; and a driving unit engaged to the opening and closing member and configured for driving the opening and closing member, wherein the opening and closing module includes:

a module body fixed to an open space between the spokes;

the opening formed in the module body; and the opening and closing member controlling the opening and closing of the opening, wherein the opening and closing member includes:

a plurality of flaps rotatably coupled to the module body and configured for opening or closing the opening; and a connection link hinge-connecting the flaps to each other.

* * * * *